US010643450B1

(12) United States Patent
Bart et al.

(10) Patent No.: US 10,643,450 B1
(45) Date of Patent: *May 5, 2020

(54) MAGNETIC SENSOR BATTERIES

(71) Applicant: Alarm.com Incorporated, Tysons, VA (US)

(72) Inventors: Gary Franklin Bart, Weston, FL (US); Mehmet Erdal Caglayan, Fort Lauderdale, FL (US); Dean Constantine, Ft. Lauderdale, FL (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/376,202

(22) Filed: Apr. 5, 2019

Related U.S. Application Data

(63) Continuation of application No. 15/918,690, filed on Mar. 12, 2018, now Pat. No. 10,255,787.

(60) Provisional application No. 62/470,017, filed on Mar. 10, 2017.

(51) Int. Cl.
| | |
|---|---|
| *G08B 21/00* | (2006.01) |
| *G08B 21/18* | (2006.01) |
| *H04N 5/225* | (2006.01) |
| *H02J 7/00* | (2006.01) |
| *G08B 29/24* | (2006.01) |
| *G08B 29/18* | (2006.01) |
| *H02J 7/02* | (2016.01) |

(52) U.S. Cl.
CPC ......... *G08B 21/182* (2013.01); *G08B 29/181* (2013.01); *G08B 29/24* (2013.01); *H02J 7/0042* (2013.01); *H02J 7/0045* (2013.01); *H04N 5/2251* (2013.01); *H02J 7/025* (2013.01)

(58) Field of Classification Search
None
See application file for complete search history.

(56) References Cited

U.S. PATENT DOCUMENTS

| | | | |
|---|---|---|---|
| 5,042,308 A | 8/1991 | Nakamura | |
| 5,617,172 A | 4/1997 | Ohta et al. | |
| 6,345,157 B1 | 2/2002 | Watanabe | |
| 8,259,221 B1 | 9/2012 | Kaplan et al. | |
| 9,222,613 B2 | 12/2015 | Myers | |
| 9,905,122 B2 * | 2/2018 | Sloo | F24F 11/30 |
| 9,974,438 B2 * | 5/2018 | Gross | H04W 76/10 |
| 2002/0194919 A1 | 12/2002 | Lee et al. | |
| 2007/0193901 A1 | 8/2007 | Cohen | |
| 2008/0194961 A1 * | 8/2008 | Randall | A61B 8/00 |
| | | | 600/459 |
| 2009/0114029 A1 | 5/2009 | Ide | |

(Continued)

*Primary Examiner* — Julie B Lieu
(74) *Attorney, Agent, or Firm* — Fish & Richardson P.C.

(57) ABSTRACT

A monitoring system that is configured to monitor a property is described. The monitoring system includes a sensor that includes a battery and that is configured to generate sensor data based on activity in a portion of the property that is within a field of view of the sensor. The monitoring system further includes a monitor control unit that is configured to: after replacement of a battery of the sensor, receive and analyze the sensor data, based on analyzing the sensor data, determine a status of the portion of the property without recalibrating the field of view of the sensor, and provide, for output, a notification that includes data describing the status of the portion of the property.

20 Claims, 5 Drawing Sheets

(56) References Cited

U.S. PATENT DOCUMENTS

| | | |
|---|---|---|
| 2009/0295169 A1* | 12/2009 | Usselman ............... F02B 63/04 |
| | | 290/1 A |
| 2014/0055618 A1 | 2/2014 | Myers |
| 2014/0159652 A1* | 6/2014 | Hall ....................... H02J 7/025 |
| | | 320/108 |
| 2014/0208859 A1 | 7/2014 | Miyashita |
| 2014/0218605 A1 | 8/2014 | Holmberg |
| 2015/0362391 A1 | 12/2015 | Suzuki |
| 2016/0266212 A1 | 9/2016 | Carlo et al. |
| 2017/0317321 A1 | 11/2017 | Kawashima |
| 2018/0095344 A1 | 4/2018 | Riddiford et al. |
| 2018/0144416 A1* | 5/2018 | Osann, Jr. ............... G05B 15/02 |

\* cited by examiner

MAGNETIC SENSOR BATTERIES

CROSS-REFERENCE TO RELATED APPLICATIONS

This application is a continuation of U.S. application Ser. No. 15/918,690, filed Mar. 12, 2018, which claims the benefit of U.S. Provisional Application No. 62/470,017, filed Mar. 10, 2017. Both of these prior applications are hereby incorporated by reference in their entirety.

TECHNICAL FIELD

This disclosure relates to battery powered sensors.

BACKGROUND

A monitoring system may include battery-powered surveillance cameras to provide video footage to the motoring system. When the batteries of the battery-powered surveillance cameras are depleted the user replaces them.

SUMMARY

Battery-powered surveillance cameras are becoming commonplace. Given the constraints of cost and size for a consumer surveillance camera, battery and camera technologies result in battery life ranging from weeks to months, depending on how often the camera detects and captures video or is remotely accessed to view video live. In some implementations, cameras may have one or more user-replaceable batteries or may have an internal rechargeable battery or a removable rechargeable battery. The battery access or removable battery may be located inside the main camera housing and may be accessed from the rear of the camera or the bottom or affixed to the camera on the rear. The battery compartment may be detached by operating a mechanical structure such as tabs, screws, or other similar connectors.

Given that cameras may be positioned so that they capture an area of interest, disturbing the camera to change batteries or relocating the camera to a temporary location to charge the camera's internal batteries may be undesirable. The process of charging the batteries can take hours, leaving the camera out of service or out of its normal position for an extended period of time. The process of changing replaceable batteries results in the user having to manually reposition the camera and can be time-consuming.

An innovative aspect of the subject matter described in this specification may be implemented in a monitoring system that includes a sensor that includes a battery and that is configured to generate sensor data based on activity in a portion of the property that is within a field of view of the sensor; and a monitor control unit that is configured to: after replacement of a battery of the sensor, receive and analyze the sensor data; based on analyzing the sensor data, determine a status of the portion of the property without recalibrating the field of view of the sensor; and provide, for output, a notification that includes data describing the status of the portion of the property.

These and other implementations can each optionally include one or more of the following features. The battery is configured to magnetically couple to the sensor. The sensor is mounted on a wall of the property. The battery is accessible from a side of the sensor that is opposite the wall of the property. The battery includes two magnets that are configured to align with two magnets of the sensor. A magnetic force between (i) the two magnets of the battery and (ii) the two magnets of the sensor is between a level required to maintain a position of the battery and a level that can be manually overcome without moving the sensor. The battery includes a battery electrical connector that is configured to connect with a sensor electrical connector upon the two magnets of the battery aligning with the two magnets of the sensor. The sensor is configured to remain stationary upon removal of the battery and attachment of the battery. The monitoring system includes a battery sensor that is configured to determine whether a battery of the sensor has a remaining power level that is below a threshold power level. The monitor control unit is configured to generate a notification indicating that the remaining power level of the battery of the sensor is below the threshold power level. The sensor is configured to maintain an orientation of the sensor during battery removal and during battery attachment. The sensor is a camera. The sensor is configured to maintain the field of view of the sensor during battery removal and during battery attachment. The battery is a rechargeable battery. The sensor includes an internal battery such that the sensor maintains connectivity to the monitor control unit during battery replacement.

Another innovative aspect of the subject matter described in this specification may be implemented in method that includes the actions of receiving, from a sensor and by a monitoring system that is configured to monitor a property, sensor data based on activity in a portion of the property that is within a field of view of the sensor; after replacement of a battery of the sensor, analyzing, by the monitoring system, the sensor data; based on analyzing the sensor data, determining, by the monitoring system, a status of the portion of the property without recalibrating the field of view of the sensor; and provide, for output by the monitoring system, a notification that includes data describing the status of the portion of the property.

These and other implementations can each optionally include one or more of the following features. The sensor is configured to maintain the field of view of the sensor during battery removal and during battery attachment. The sensor is configured to maintain an orientation of the sensor during battery removal and during battery attachment. The battery includes two magnets that are configured to align with two magnets of the sensor. The battery is configured to magnetically couple to the sensor. The sensor is configured to remain stationary upon removal of the battery and attachment of the battery. The sensor is mounted on a wall of the property. The battery is accessible from a side of the sensor that is opposite the wall of the property.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. A user may replace a battery of a battery powered camera without disrupting the orientation of the camera. The system may continue to analyze the image data provided by the camera using the same process before and after the battery replacement because the field of the view of the camera does not change during battery replacement.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference numbers represent corresponding parts throughout.

DETAILED DESCRIPTION

Figure 1:
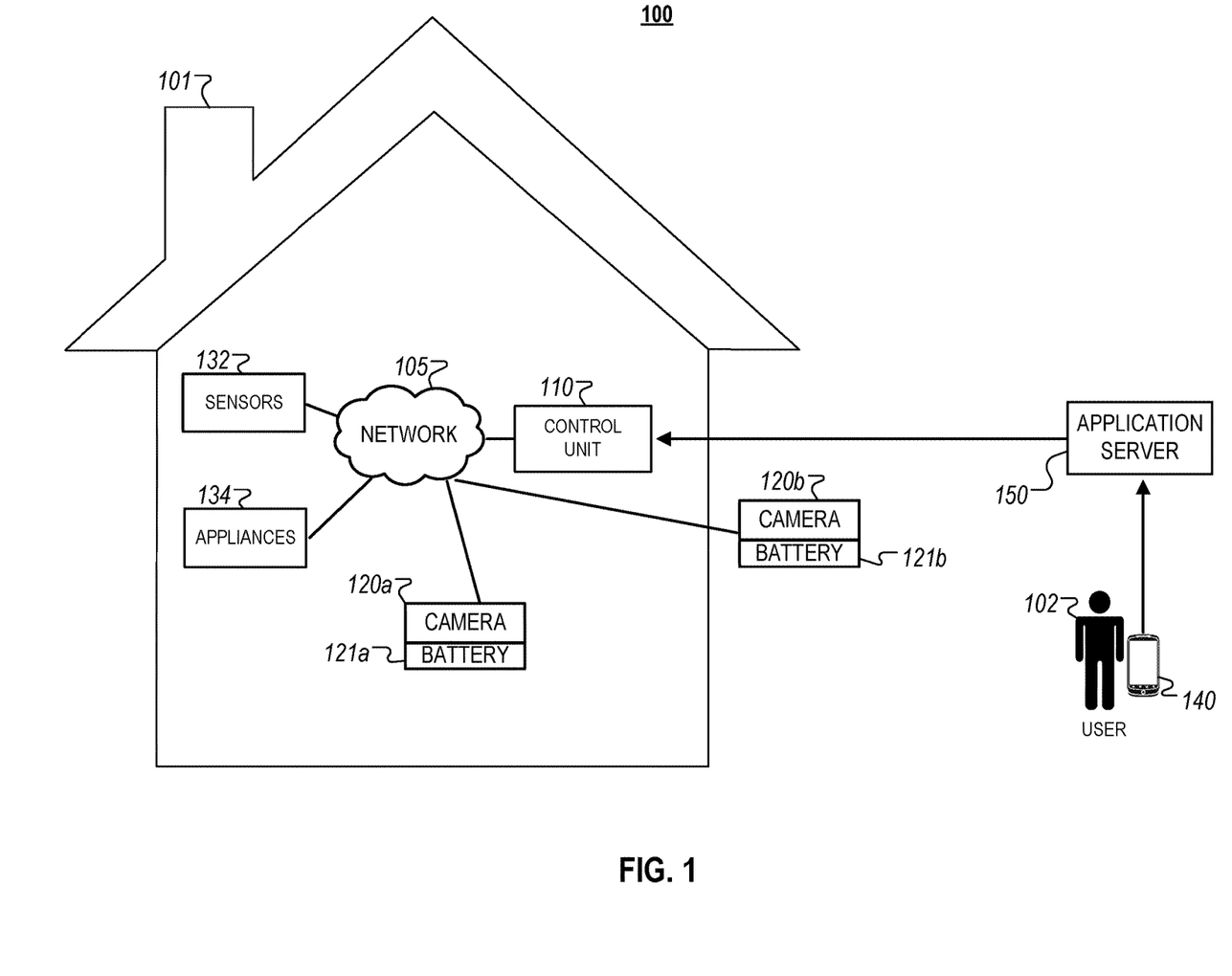
FIG. 1 illustrates an example of a system having a battery-powered camera.

FIG. 1 illustrates an example of an electronic system 100 having battery-powered camera. The electronic system 100 includes a monitor control unit 110, battery-powered cameras 120a and 120b, sensors 132, appliances 134, a user device 140, and an application server 150 connected over a network 105 within a property 101. The user device 140 can be associated with a user 102 such that the user 102 may view an image from and/or control the battery-powered cameras 120a and 120b and/or other components of the electronic system 100.

In general, the system 100 uses the battery-powered cameras 120a and 120b to collect image data around the property 101. The battery-powered cameras 120a and 120b may be placed anywhere around the property 101. For example, battery-powered camera 120a may be located inside the property 101 to collect image data in a particular room of the property 101. As another example, battery-powered camera 120b may be located outside the property 101 to collect image data in a particular area of the lawn. The control unit 110 may be able to control panning and zooming actions of the battery-powered cameras 120a and 120b. The battery-powered cameras 120a and 120b may be wireless in that they communicate wirelessly with the control unit 110 over the network 105 and they are not wired to an electrical source. The image data captured by the battery-powered cameras 120a and 120b may be processed by the control unit 110 or the application server 150 to identify activity or objects in the images. The user 102 may view the image data on the user device 140.

The network 105 is configured to enable exchange of electronic communications between devices connected to the network 105. For example, the network 105 may be configured to enable exchange of electronic communications between the monitor control unit 110, the battery-powered cameras 120a and 120b, the sensors 132, the appliances 134, the user device 140, and the application server 150. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitor control unit 110 may include a controller and a network module. The controller is configured to control a monitoring system (e.g., a home alarm or security system) that includes the battery-powered cameras 120a and 120b. In some examples, the controller may include a processor or other control circuitry configured to execute instructions of a program that controls operation of an alarm system. In these examples, the controller may be configured to receive input from sensors, detectors, or other devices included in the alarm system and control operations of devices included in the alarm system or other household devices (e.g., a thermostat, an appliance, lights, etc.). For example, the controller may be configured to control operation of the network module included in the battery-powered cameras 120a and 120b.

The network module is a communication device configured to exchange communications over the network 105. The network module may be a wireless communication module configured to exchange wireless communications over the network 105. For example, the network module may be a wireless communication device configured to exchange communications over a wireless data channel and a wireless voice channel. In this example, the network module may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module also may be a wired communication module configured to exchange communications over the network 105 using a wired connection. For instance, the network module may be a modem, a network interface card, or another type of network interface device. The network module may be an Ethernet network card configured to enable the battery-powered cameras 120a and 120b to communicate over a local area network and/or the Internet. The network module also may be a voice band modem configured to enable the alarm panel to communicate over the telephone lines of Plain Old Telephone Systems (POTS).

In some implementations, the battery-powered cameras 120a and 120b each provide an industrial design where the battery compartment can, within the same dimensions and form, contain one or more conventional batteries, standard rechargeable batteries, or a rechargeable battery pack (such as a Lithium Ion) such that no changes in the design or mechanical structure of the main camera body or outer battery shell needs to be changed to accommodate any of the battery technologies.

In some implementations, the battery-powered cameras 120a and 120b each provide a magnetic coupling between a battery housing 121 and camera body 120 with a magnetic force adequate to hold the battery housing 121 to the body 120 but weak enough to allow for removal of the battery 121 housing by a user. This configuration allows for quick and easy changing of the battery 121 without disturbing the camera body 120 and how it is aimed.

Figure 2A:
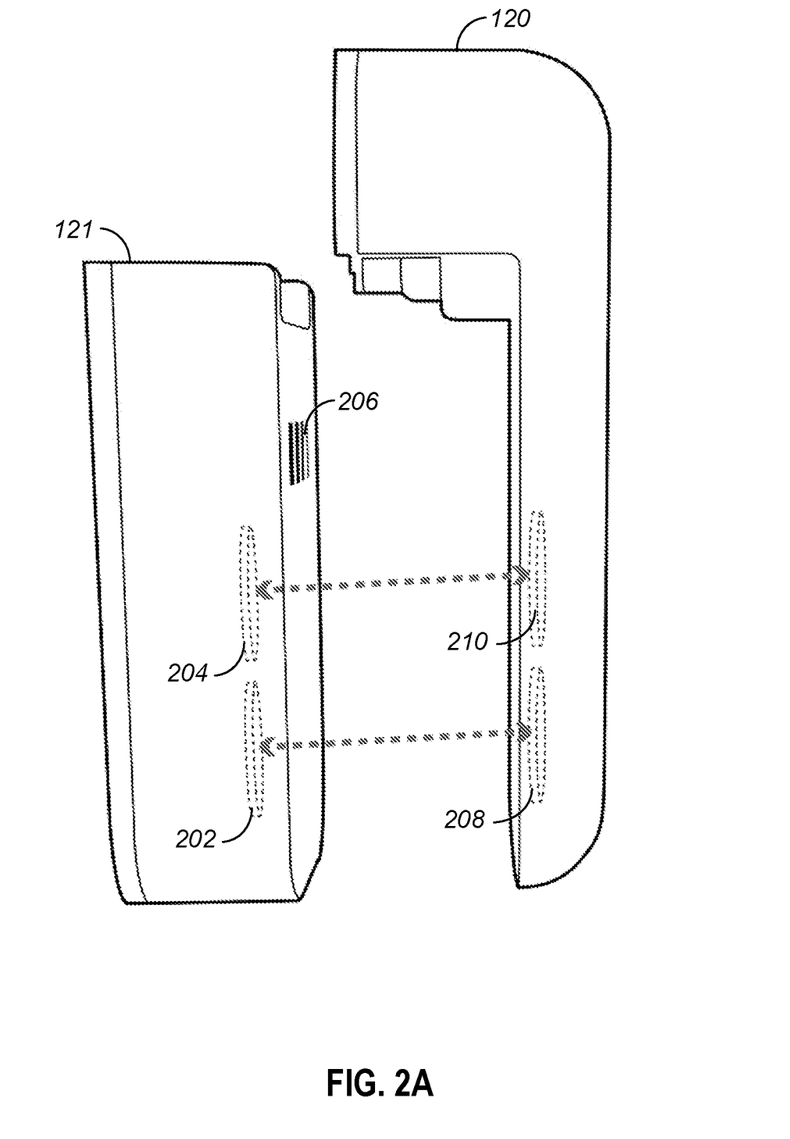
FIGS. 2A and 2B illustrate an example of a battery-powered camera and a battery.
Figure 2B:
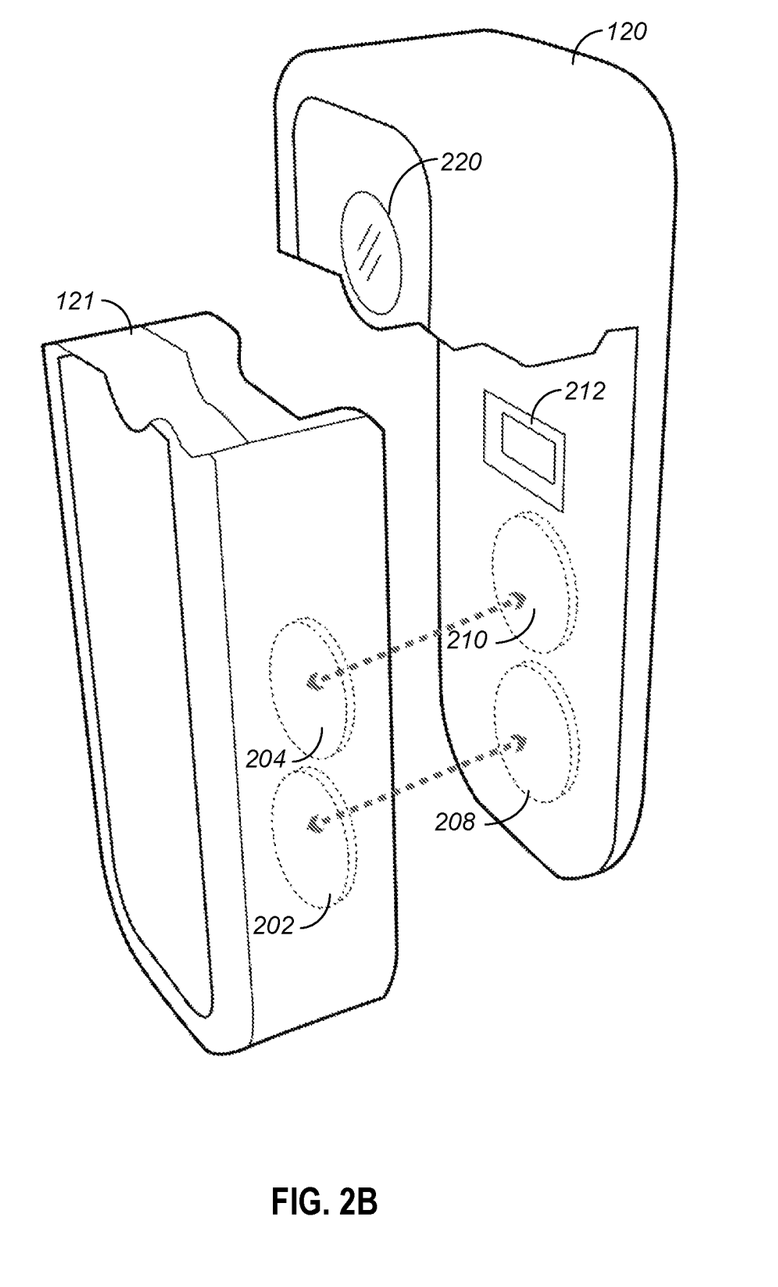

In some implementations, the battery-powered cameras 120a and 120b each provide for a variety of magnets in arrangements that cause the battery housing and camera body to be aligned properly. As illustrated in examples shown in FIGS. 2A and 2B, magnets 204 and 210 couple together and magnets 202 and 208 couple together to maintain the connection between the battery 121 and the camera 120.

In some implementations, the battery-powered cameras 120a and 120b each provide for a mechanical coupling of the electrical connections between the battery housing and the camera body using conductive pins on one device and conductive pads on the other or a similar structure. As illustrated in examples shown in FIGS. 2A and 2B, pins 206 and 212 connect to each other as the magnets 202 and 208 and magnets 204 and 210 couple together. In some implementations, the pins 206 and 212 may be inductive connections. In this instance, the pins 206 and 212 may not connect through a conductor. Instead, the pins 206 and 212 may be covered with the housing of the battery 121 or camera 120

In some implementations, to minimize the time during which the battery-powered cameras 120a and 120b are offline for a battery change, the battery-powered cameras 120a and 120b may include additional batteries similar to battery 121 so that either new batteries or freshly charged batteries can replace the depleted batteries The depleted batteries may be discarded or put on a charging device to remain off the battery-powered cameras 120a and 120b until the cycle is repeated. As some battery-powered cameras 120a and 120b are mounted in locations that may require, for example, the use of a ladder to access, this approach allows the battery to be swapped out with only one trip up the ladder.

The battery-powered cameras 120a and 120b also may include a communication module that enables the battery-powered cameras 120a and 120b to communicate other devices of the system 100. The communication module may be a wireless communication module that allows the battery-powered cameras 120a and 120b to communicate wirelessly. For instance, the communication module may be a Wi-Fi module that enables the battery-powered cameras 120a and 120b to communicate over a local wireless network at the property. The communication module further may be a 900 MHz wireless communication module that enables the battery-powered cameras 120a and 120b to communicate directly with the monitor control unit 110. Other types of short-range wireless communication protocols, such as Bluetooth, Bluetooth LE, Z-wave, ZigBee, etc., may be used to allow the battery-powered cameras 120a and 120b to communicate with other devices in the property.

The battery-powered cameras 120a and 120b further may include processing and storage capabilities. The battery-powered cameras 120a and 120b may include any suitable processing devices that enable the battery-powered cameras 120a and 120b to operate applications and perform the actions described throughout this disclosure. In addition, the battery-powered cameras 120a and 120b may include solid state electronic storage that enables the battery-powered cameras 120a and 120b to store applications, configuration data, collected sensor data, and/or any other type of information available to the battery-powered cameras 120a and 120b.

The system 100 may also include one or more sensors or detectors. For example, the system 100 may include multiple sensors 132. The sensors 132 may include a contact sensor, a motion sensor, a glass break sensor, or any other type of sensor included in an alarm system or security system. The sensors 132 also may include an environmental sensor, such as a temperature sensor, a water sensor, a rain sensor, a wind sensor, a light sensor, a smoke detector, a carbon monoxide detector, an air quality sensor, etc. The sensors 132 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 132 may include a radio-frequency identification (RFID) sensor that identifies a particular article that includes a pre-assigned RFID tag.

In some implementations, the battery-powered cameras 120a and 120b may be video/photographic cameras or other type of optical sensing devices configured to capture images. For instance, the battery-powered cameras 120a and 120b may be configured to capture images of an area within a building monitored by the monitor control unit 110. The optical sensor 220 may be configured to capture single, static images of the area and also video images of the area in which multiple images of the area are captured at a relatively high frequency (e.g., thirty images per second). The battery-powered cameras 120a and 120b may be controlled based on commands received from the monitor control unit 110.

The appliances 134 may be home automation devices connected to the network 105 that are configured to exchange electronic communications with other devices of the system 100. The appliances 134 may include, for example, connected kitchen appliances, controllable light sources, safety and security devices, energy management devices, and/or other types of electronic devices capable of exchanging electronic communications over the network 105. In some instances, the appliances 134 may periodically transmit information and/or generated data to the monitor control unit 110 such that the monitor control unit 110 can automatically control the operation of the appliances 134 based on the exchanged communications. For example, the monitor control unit 110 may operate one or more of the appliances 134 based on a fixed schedule specified by the user. In another example, the monitor control unit 110 may enable or disable one or more of the appliances 134 based on received sensor data from the sensors 132.

The user device 140 may be any type of personal electronic computing device that is associated with a property management company that operates the application server 150. The user device 140 may be one or more of a cellular telephone, smartphone, a tablet-computing device, a laptop computing device, a desktop computing device, a wearable device, or any other type of network-enabled electronic device.

The user device 140 may include a native application that enables communications with devices located within the property 101 through the application server 150. The native application refers to software/firmware programs running on the user device 140 that enable various features. For instance, the user device 140 may load or install the native application based on data received over a network 105 or data received from local media. The native application may run on various mobile device platforms associated with the user device 140.

In some implementations, the native application of the user device 140 identifies a geographic location associated with the user device 140 and communicates information identifying the geographic location. For example, the user device 140 having the native application may determine a geographic location of the user device 140 using GPS capabilities, and may communicate data identifying the geographic location to the application server 150. In some instances, the native application may check the location of the user device 140 periodically and may detect when a user is presently located inside or outside a property.

Additionally, or alternatively, the user device 140 may communicate with the monitor control unit 110 and/or the battery-powered cameras 120a and 120b using various local wireless protocols, such as Wi-Fi, Bluetooth, Z-Wave, ZigBee, Home Plug, HPAV, HPAV2, G.hn (Ethernet over power line), or wired protocols such as Ethernet, USB, and other wired protocols based on the RS232, RS485, and/or RS422 standards.

The application server 150 may be an electronic device configured to provide monitoring services for the property 101. The application server 150 may exchange electronic communications with the monitor control unit 110, the battery-powered cameras 120a and 120b, the sensors 132, the appliances 134, and the user device 140 over the network 105. For example, the application server 150 may obtain and store the property condition data 122 within the repository 152 to maintain a historical rental and/or maintenance record associated with the property 101.

In some implementations, the application server 150 is operated and/or maintained by, for example, a property management company that manages property rentals for multiple properties including the property 101. For example, the application server 150 may be associated with rental management system (e.g., through a web page or through a mobile application) that enables prospective occupants to make a rental selection of a property that is made available by the property management company. In such implementations, the user 102 can be an employee of the rental management company that inspects and/or performs an inspection of the property 101 prior to the start of a rental period, or after the termination of a rental period.

Alternatively, in other implementations, the application server 150 may instead by operated and/or maintained by a third party that is distinct from the property management company but otherwise has access to rental data associated with the property 101 (e.g., data included within the repository 152). In such implementations, the application server 152 may obtain property information from a system of the property management company for storage within the repository 152.

The application server 150 may be configured to monitor events (e.g., alarm events, emergency conditions, etc.) generated by the monitor control unit 110 and/or the battery-powered cameras 120a and 120b. For example, the application server 150 may exchange electronic communications with the network module included in the monitor control unit 110 to receive information regarding events (e.g., fire, carbon monoxide) detected by the monitor control unit 110. The application server 150 also may receive information regarding events (e.g., alarm events) from the battery-powered cameras 120a and 120b.

The application server 150 may also store sensor and image data received from the system 100 and perform analysis of sensor and image data received from the system 100. Based on the analysis, the application server 150 may communicate with and control aspects of the monitor control unit 110, the battery-powered cameras 120a and 120b, or the user device 140. In addition, the application server 150 may store dynamic object data (e.g., based on sensor data collected by the sensors 132), or information associated with dynamic object data (e.g., historical status information associated with dynamic objects). The application server 150 may also store data associated with the dynamic multi-dimensional spatial representations that are determined for the property 101. For example, the application server 150 may store historical data associated with previously generated spatial representations of the property 101 over a specified period of time.

In some implementations, before replacing the battery 121a, the user 102 may indicate, through the user device 140 or the control unit 110, that the user 102 is about to replace the battery 121a. The system 100 may enter a battery swap mode in which the system 100 does not generate an alert when a sensor, such as camera 120a loses power, for example, because of a battery removal. While the system 100 is in battery swap mode, the user 102 may remove and replace the battery 121a. The user 102 may indicate through the user device 140 or the control unit 110 that the battery swap process is complete. The system 100 exits the battery swap mode. In some implementations, the system 100 may automatically exit the battery swap mode when it detects that the camera 120a is active again.

In some implementations, the battery swap mode may only apply to a particular camera and battery pair. For example, the user 102 may indicate that the user 102 is going to replace battery 121a. If during the battery swap mode, the user 102 or another user removes batter 121b, then the system 100 would generate an alert. The alert may indicate that camera 120b is potentially being tampered with. The system 100 may generate an alert at any point that a battery is removed and the system 100 is not in battery swap mode.

In some implementations, the user 102 may receive a notification indicating that battery 121b should be replaced. The notification may include an option to request that the system 100 enter battery swap mode so that the user 102 may replace the battery 121b.

Figure 3:
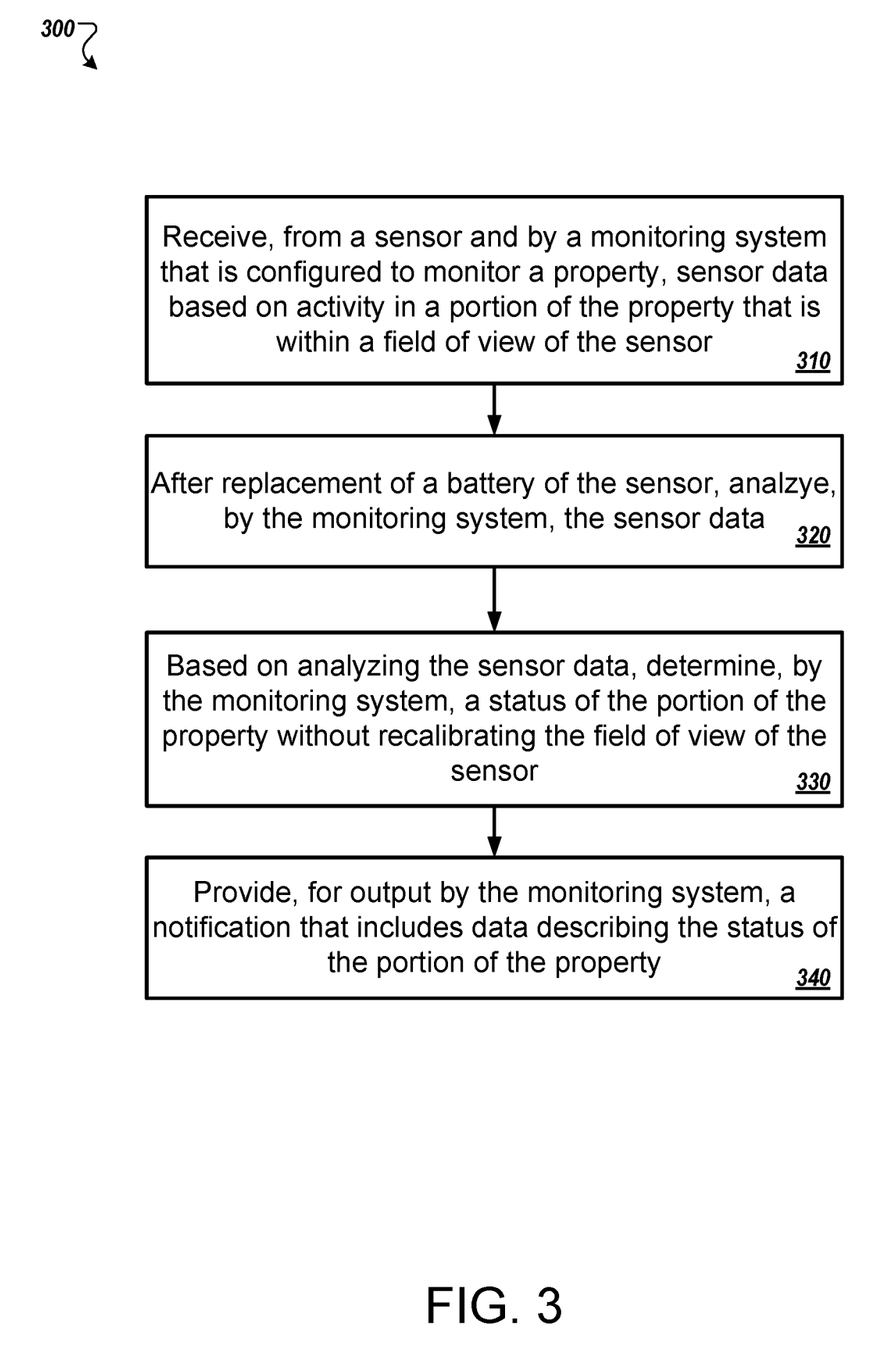
FIG. 3 is a flowchart of an example process for replacing the batteries of a sensor without disrupting an orientation of the sensor.

FIG. 3 is a flowchart of an example process 300 for replacing the batteries of a sensor without disrupting an orientation of the sensor. The operations of the process 30 are described generally as being performed by the monitoring system 100 of FIG. 1. In some implementations, the operations of the process 300 may be performed by any combination of one of more computing devices, for example, the control unit 110 or the application server 150.

The system receives, from a sensor, sensor data based on activity in a portion of the property that is within a field of view of the sensor (310). The sensor may be located on a wall in the foyer and capture the portion of the foyer that includes the front door. In some implementations, the sensor may be a camera, motion detector, infrared sensor, or any other type of sensor that has a field of view. A microphone may be an example of a sensor that doesn't have a field of view since it captures sounds within a certain distance. The activity may be any movement or absence of movement within the field of view. For example, the sensor may be a camera trained on the front door. The camera may record the front door while there are no people moving through the door and/or people are moving through the door. The camera may also be motion triggered so that it records when there is movement within the field of view.

The system, after replacement of a battery of the sensor, analyzes the sensor data (320). In some implementations, the battery compartment of the sensor may be located on a back of the sensor. A user may have to remove the sensor to replace the batteries. In instances where the user has to remove and replace the sensor, the system may analyze a different field of view captured by the camera. For example, the system may analyze a particular portion of the field of view labeled as the front door. The user may be previously indicated to the system where the front door is located in the field of view, or frame, of the camera. For example, the front door may be located in the middle third of the frame captured by the camera. If the user moves the camera, then the door may be located in the right third of the frame. The system may still analyze the middle third of the frame because the system may not have data indicating that the door is now in the right third of the frame.

In instances where the battery is accessible from the front of the sensor and removable without changing the orientation of the sensor, the user may replace the battery without recalibrating or updating the field of view of the sensor. Not having to recalibrate or update the field of view of the sensor reduces the processing of the system as the user may perform several tests to ensure the user has identified the correct portion of the frame for the system to analyze.

In some implementations, the battery couples to the sensor using magnets. The power of the magnets may be such that the battery pack may maintain an electrical connection with the sensor when the battery is on the sensor and may be removable with user force without disrupting the orientation of the sensor. In some implementations, the battery is a rechargeable battery. In some implementations, the sensor includes an internal battery that is recharged by the removable battery and that maintains the connection between the sensor and the system during battery replacement.

The system, based on analyzing the sensor data, determines a status of the portion of the property without recalibrating the field of view of the sensor (330). The system may analyze the sensor data in a similar fashion both before and after the battery replacement. This may be because the orientation of the sensor does not change during battery replacement. In some implementations, the system may determine that there is no movement in the field of view of the sensor. The system provides, for output, a notification that includes data describing the status of the portion of the property (340). The notification may indicate that there is no activity. The notification may be displayed within an application that accesses data provided by the system. In some implementations, the system may determine that there is movement within the field of view of the sensor. The system may generated a notification indicating that there is movement in the field of view of the sensor and provide the notification to the an application that accesses data provided by the system.

In some implementations, the system may generate a notification indicating that the battery power is low and provide the notification to a user. The user may replace the battery in response to the notification to ensure that the sensor functions without interruption.

Figure 4:
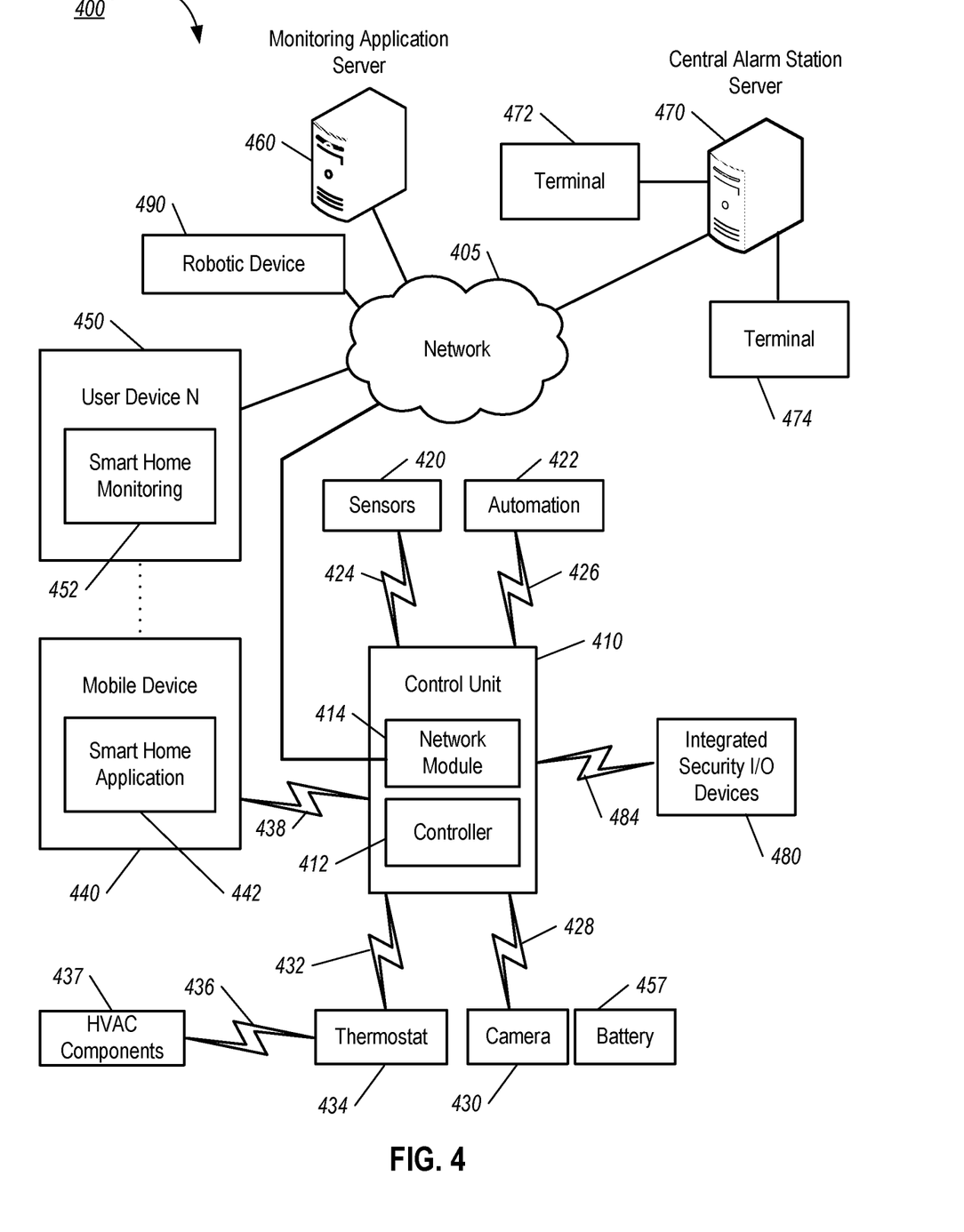
FIG. 4 illustrates an example monitoring system.

FIG. 4 is a diagram illustrating an example of a home monitoring system 400. The electronic system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. Also, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

In some implementations, the camera 430 may be a battery-powered camera with battery 457. The camera may be similar to camera 120*a* or 102*b* of FIG. 1. The battery 457 may be similar to the batteries 121*a* and 121*b* of FIG. 1, battery 121 of FIG. 2A, and battery 121 of FIG. 2B. The battery 457 may be a magnetic battery that is configured to magnetically couple to the camera 430. Other sensors or devices in the monitoring system 400 may include a similar battery that magnetically couples to each sensor.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and also roll along the ground, walls, or ceiling) and land vehicle type devices (e.g., automated cars that drive around a home). In some cases, the robotic devices 490 may be robotic devices 490 that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

Also, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events (e.g., alarm events) generated by the control unit 410. In this example, the monitoring server 460 may exchange electronic communications with the network module 414 included in the control unit 410 to receive information regarding events (e.g., alerts) detected by the control unit 410. The monitoring server 460 also may receive information regarding events (e.g., alerts) from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The central alarm station server 470 is an electronic device configured to provide alarm monitoring service by exchanging communications with the control unit 410, the one or more mobile devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the smart home application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart home application 442. The smart home application 442 refers to a software/firmware program running on the corresponding mobile device that enables the user interface and features described throughout. The user device 440 may load or install the smart home application 442 based on data received over a network or data received from local media. The smart home application 442 runs on mobile devices platforms, such as iPhone, iPod touch, Blackberry, Google Android, Windows Mobile, etc. The smart home application 442 enables the user device 440 to receive and process image and sensor data from the monitoring system.

The user device 450 may be a general-purpose computer (e.g., a desktop personal computer, a workstation, or a laptop computer) that is configured to communicate with the monitoring server 460 and/or the control unit 410 over the network 405. The user device 450 may be configured to display a smart home user interface 452 that is generated by the user device 450 or generated by the monitoring server 460. For example, the user device 450 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and the robotic devices 490. The one or more user devices 440 and 450 receive data directly from the sensors 420, the home automation controls 422, the camera 430, and the robotic devices 490 and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490 are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490. In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required. In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

In some implementations, any of the actions performed by the control unit 410 may be performed by the monitoring application server 460 and/or the central alarm station server 470. Similarly, any of the actions performed by the monitoring application server 460 and/or the central alarm station server 470 may be performed by the control unit 410.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices;

magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system that is configured to monitor a property, the monitoring system comprising:
   a sensor that (i) is located on a wall of the property, (ii) includes a battery that is accessible from a side of the sensor that is opposite the wall of the property, and (iii) is configured to:
      determine that the battery has been replaced;
      after determining that the battery has been replaced, generate sensor data that reflects an attribute of the property; and
      transmit the sensor data and data indicating that the battery has been replaced; and
   a monitor control unit that is configured to:
      receive the sensor data and the data indicating that the battery has been replaced;
      based on the sensor data and the data indicating that the battery has been replaced, determine a status of the property using settings of the sensor before the battery was replaced; and
      provide, for output, a notification indicating the status of the property.

2. The monitoring system of claim 1, wherein the battery includes two magnets that are configured to align with two magnets of the sensor.

3. The monitoring system claim 2, wherein a magnetic force between (i) the two magnets of the battery and (ii) the two magnets of the sensor is between a level required to maintain a position of the battery and a level that can be manually overcome without moving the sensor.

4. The monitoring system of claim 2, wherein the battery includes a battery electrical connector that is configured to connect with a sensor electrical connector upon the two magnets of the battery aligning with the two magnets of the sensor.

5. The monitoring system of claim 1, wherein the sensor is configured to remain stationary upon removal of the battery and attachment of the battery.

6. The monitoring system of claim 1, wherein the sensor is a camera.

7. The monitoring system of claim 1, wherein the sensor is configured to maintain the settings of the sensor during removal of the battery and attachment of the battery.

8. The monitoring system of claim 1, wherein the battery is a rechargeable battery.

9. The monitoring system of claim 1, comprising:
   a battery sensor that is configured to determine whether the battery of the sensor has a remaining power level that is below a threshold power level,
   wherein the monitor control unit is configured to:
      generate a notification indicating that the remaining power level of the battery of the sensor is below the threshold power level.

10. The monitoring system of claim 1, wherein the sensor is configured to:
    generate data indicating that the settings of the sensor were unchanged during the replacement of the battery.

11. A computer-implemented method comprising:
    determining that a battery of a sensor that (i) is located on a wall of a property, (ii) includes a battery that is accessible from a side of the sensor that is opposite the wall of the property, has been replaced;
    after determining that the battery has been replaced, generating sensor data that reflects an attribute of the property;
    based on the sensor data and determining that the battery of the sensor has been replaced, determining a status of the property using settings of the sensor before the battery was replaced; and
    providing, for output, a notification indicating the status of the property.

12. The method of claim 11, wherein the battery includes two magnets that are configured to align with two magnets of the sensor.

13. The method of claim 11, wherein a magnetic force between (i) the two magnets of the battery and (ii) the two magnets of the sensor is between a level required to maintain a position of the battery and a level that can be manually overcome without moving the sensor.

14. The method of claim 11, wherein the battery includes a battery electrical connector that is configured to connect with a sensor electrical connector upon the two magnets of the battery aligning with the two magnets of the sensor.

15. The method of claim 11, wherein the sensor is configured to remain stationary upon removal of the battery and attachment of the battery.

16. The method of claim 11, wherein the sensor is a camera.

17. The method of claim 11, wherein the sensor is configured to maintain the settings of the sensor during removal of the battery and attachment of the battery.

18. The method of claim 11, wherein the battery is a rechargeable battery.

19. The method of claim 11, comprising:
    generating a notification indicating that a remaining power level of the battery of the sensor is below a threshold power level.

20. The method of claim 11, comprising:
    determining that the settings of the sensor were unchanged during the replacement of the battery.

* * * * *